UNITED STATES PATENT OFFICE.

EMIL KNOEVENAGEL, OF HEIDELBERG, GERMANY.

TREATMENT OF ACETYL CELLULOSE TO ENHANCE ITS ELASTICITY AND ITS POWER OF ABSORPTION FOR DYESTUFFS.

981,574.     Specification of Letters Patent.     Patented Jan. 10, 1911.

No Drawing.     Application filed April 30, 1909. Serial No. 493,159.

*To all whom it may concern:*

Be it known that I, EMIL KNOEVENAGEL, professor of chemistry, a subject of the German Emperor, residing at Heidelberg, Germany, have invented certain new and useful Improvements in the Treatment of Acetyl Cellulose to Enhance its Elasticity and its Power of Absorption for Dyestuffs, of which the following is a specification.

My application for patent Serial No. 403573, filed 23rd November 1907 describes a process for dyeing acetyl cellulose and filaments and other products of the same in aqueous solution, which materials may be dyed easily and completely, if the acetyl-cellulose has been subjected to a preliminary treatment with organic compounds and especially with their solutions in water, after which the superfluous liquid is pressed out or the materials are washed with water and then the materials dyed in aqueous solutions in the known manner. Further experiments have shown, that by treating the acetyl-cellulose with solutions of inorganic acids a modification of the surface may be produced similar to that obtainable by mixtures of organic compounds and their aqueous solutions, which modification shows itself chiefly by a strong swelling or increase of volume. This swelling is accompanied by a large increase of the power of absorption for dyes in dyeing by known methods. In the same manner the power of absorbing amins and phenols is enhanced, which bodies may then be converted into dyes on the fiber by known methods, or which have already the nature of dyes and whose color may be deepened on the fiber by known methods. At the same time this treatment of acetyl-cellulose with solutions of inorganic acids enhances considerably the elasticity of acetyl-cellulose, although it is not possible to prove any appreciable hydrolytic decomposition of the acetyl cellulose treated in this manner, and the same treatment also produces a bleaching effect. The property of acetyl cellulose, of being dyed easily, remains unimpaired after this treatment with solutions of inorganic acids, even if the solutions of inorganic acids are afterward completely removed by washing, for instance with water. In a dry condition, however, the acetyl cellulose, treated as described, retains the property of not taking up dyes, unlike dry cellulose, which as is well known, is dyed by substantive dyestuffs. The acetyl cellulose treated with inorganic acids, has therefore not been saponified by this treatment. The enhanced elasticity of the acetyl cellulose treated as described, is however preserved completely, even after the drying.

The acetyl cellulose preferably used in my present process is a triacetyl cellulose. After treatment with inorganic acids it is soluble in glacial acetic acid and chloroform, sparingly soluble in acetone and insoluble in ether, carbon-tetra-chlorid and acetylene-tetrachlorid.

The following example will serve to explain the details of procedure:—Filaments or films of acetyl cellulose are treated with concentrated aqueous hydrochloric acid preferably of about 37 per cent. strength, or a similarly acting acid of suitable strength, such as a 65 per cent. hydrobromic acid or a 50 per cent. nitric acid or a 50 per cent. sulfuric acid for about five minutes, thereby causing it to swell or increase in volume. If the acetyl cellulose is subsequently washed with water, it possesses a high degree of elasticity even after drying. After washing, and before it has dried, the acetyl cellulose thus treated may be dyed easily and fully with dyes in the shape of aqueous solutions. For instance, methylene blue is absorbed in such quantity, that almost black tints are produced, which cannot be attained in the same degree by the processes described in my application for Patent No. 403573. Amins and phenols, for instance anilin and beta-naphthol, are absorbed easily and abundantly by acetyl cellulose after such swelling, for instance, from dilute aqueous solutions, so that in this case also fuller tints may be produced on the fiber than is the case with the process according to my application No. 403575.

What I claim is:—

1. In the herein described process of dyeing acetyl cellulose, the preliminary step of enhancing the elasticity and power of absorption of acetyl cellulose, which consists in treating the acetyl cellulose with a solution of hydrochloric acid and then removing the superfluous acid.

2. The herein described process for dyeing acetyl cellulose, which consists in treating the acetyl cellulose with a solution of hydrochloric acid, removing the superfluous acid and then dyeing in an aqueous dye-stuff solution.

3. The herein described process for dyeing acetyl cellulose, which consists in treating the acetyl cellulose with an aqueous solution of hydrochloric acid, rinsing it with water and then dyeing the acetyl cellulose in an aqueous dye-stuff solution.

In testimony whereof I have hereunto set my hand in presence of two subscribing witnesses.

EMIL KNOEVENAGEL.

Witnesses:
 ALBERT KNOLL,
 HERMANN TAEGER.